March 7, 1950  J. P. SEAHOLM  2,499,882
VEHICLE HITCH JACK
Filed Oct. 9, 1944   3 Sheets-Sheet 1
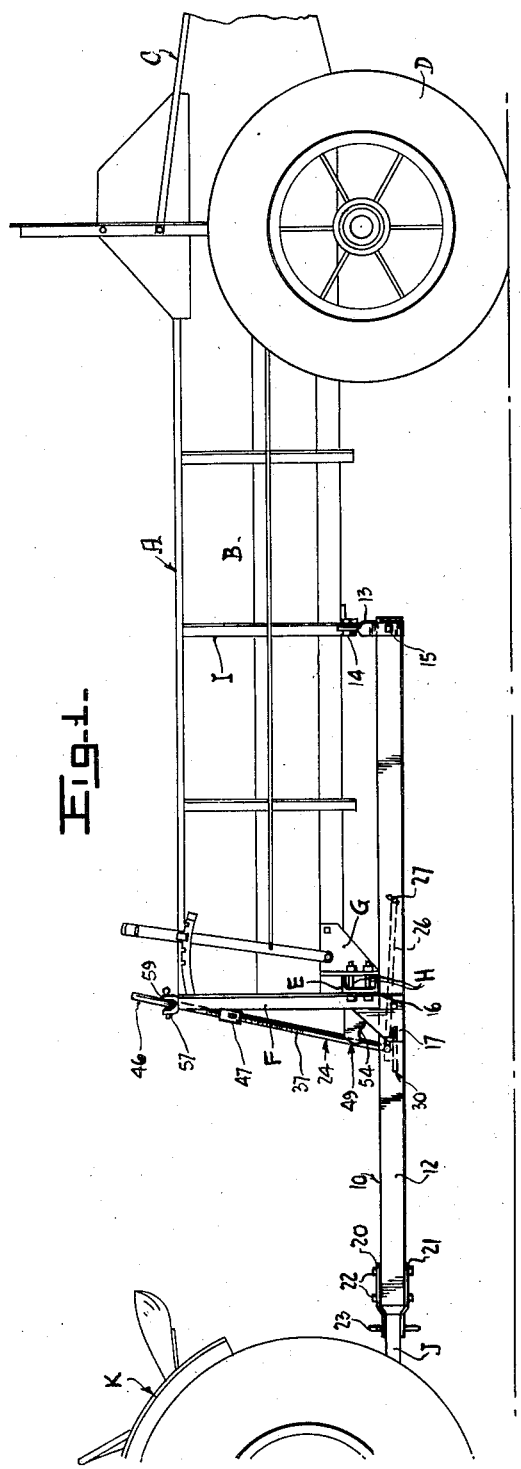
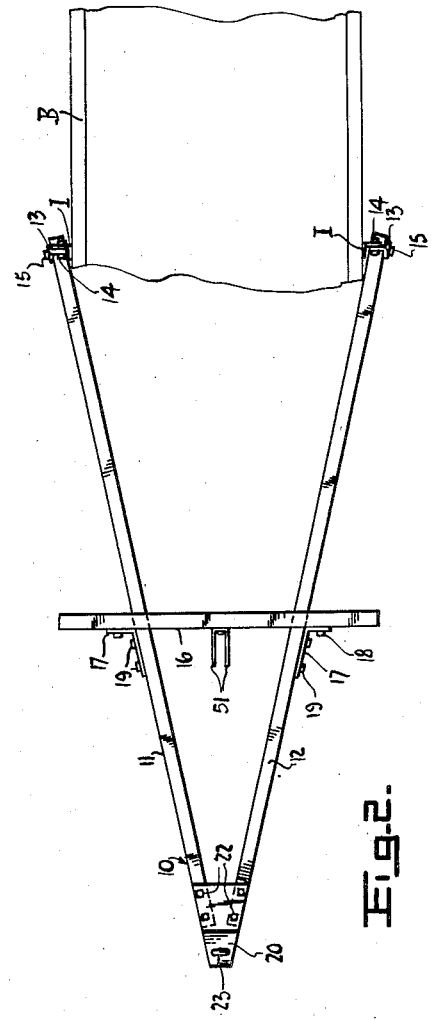
Inventor
JOHN P. SEAHOLM
By Carlsen + Hayle
Attorneys March 7, 1950 — J. P. SEAHOLM — 2,499,882
VEHICLE HITCH JACK
Filed Oct. 9, 1944 — 3 Sheets-Sheet 2
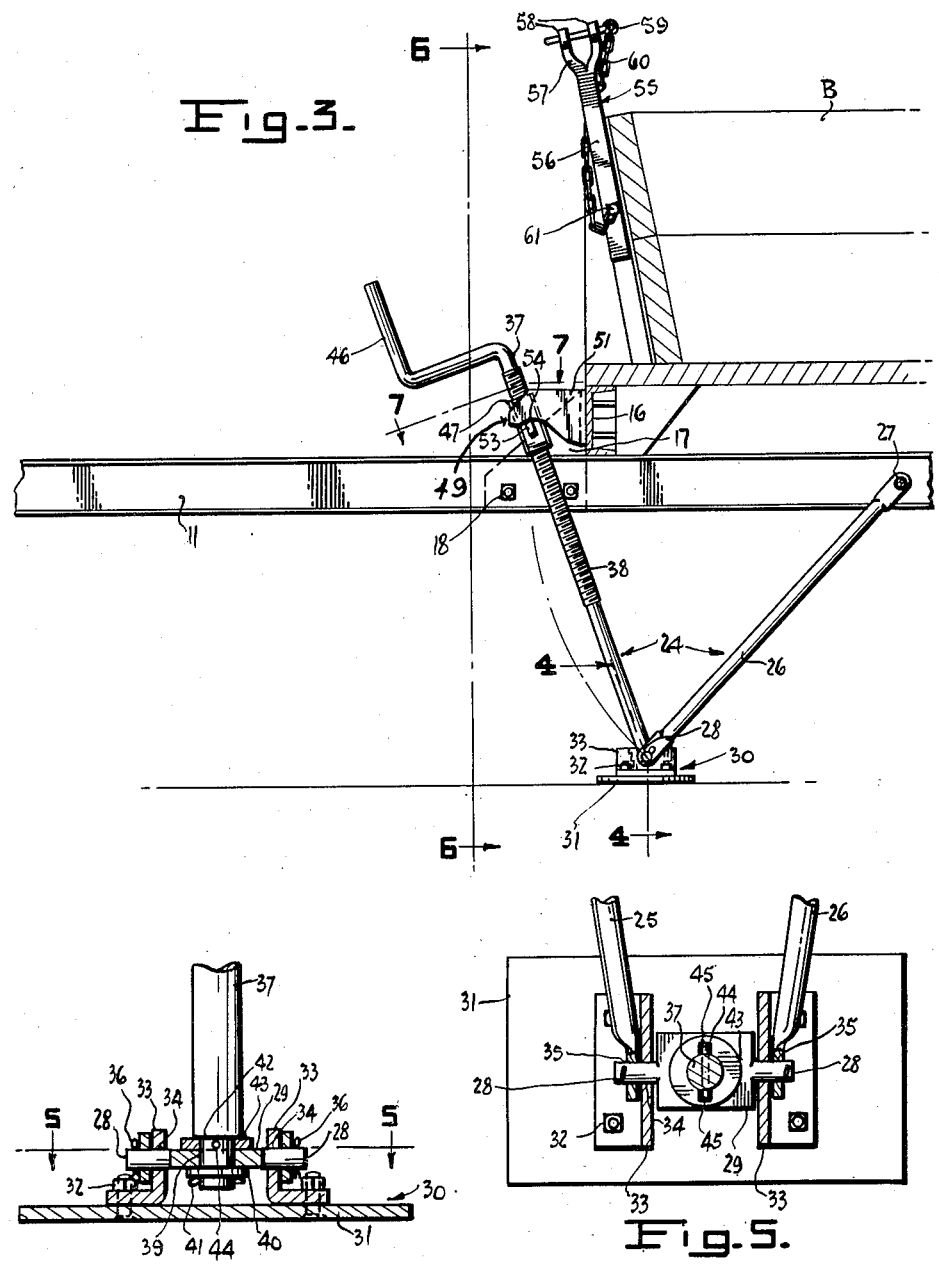
Inventor
JOHN P. SEAHOLM
By Carlsen + Hagle
Attorneys March 7, 1950 J. P. SEAHOLM 2,499,882
VEHICLE HITCH JACK
Filed Oct. 9, 1944 3 Sheets-Sheet 3

Inventor
JOHN P. SEAHOLM
By Carlsen + Hazle
Attorneys

Patented Mar. 7, 1950

2,499,882

UNITED STATES PATENT OFFICE 2,499,882

VEHICLE HITCH JACK

John P. Seaholm, Moline, Ill., assignor, by mesne assignments, to Minneapolis-Moline Company, Hopkins, Minn., a corporation of Minnesota Application October 9, 1944, Serial No. 557,795

5 Claims. (Cl. 254—86)

This invention relates to improvements in jack structures for vehicles.

The object of my invention is to provide a jack structure of very simple and durable construction, which may be readily put into operative condition when required, and which may be as readily placed in an elevated or transport position when not in use.

Further and more detailed objects and advantages will appear in the course of the following specification, reference being had to the accompanying drawings, wherein:

Fig. 1 is a side elevation of a spreader equipped with my invention and with the jack mechanism elevated to a transport or idle position, and the draft means connected to a tractor.

Fig. 2 is a plan view of the hitch, with the jack removed and with parts of the spreader body or box broken away.

Fig. 3 is an enlarged longitudinal vertical sectional view through the forward part of the vehicle, showing the jack in operative position.

Fig. 4 is a further enlarged fragmentary sectional view along the line 4—4 in Fig. 3.

Fig. 5 is a horizontal sectional view along the line 5—5 in Fig. 4.

Figure 6:
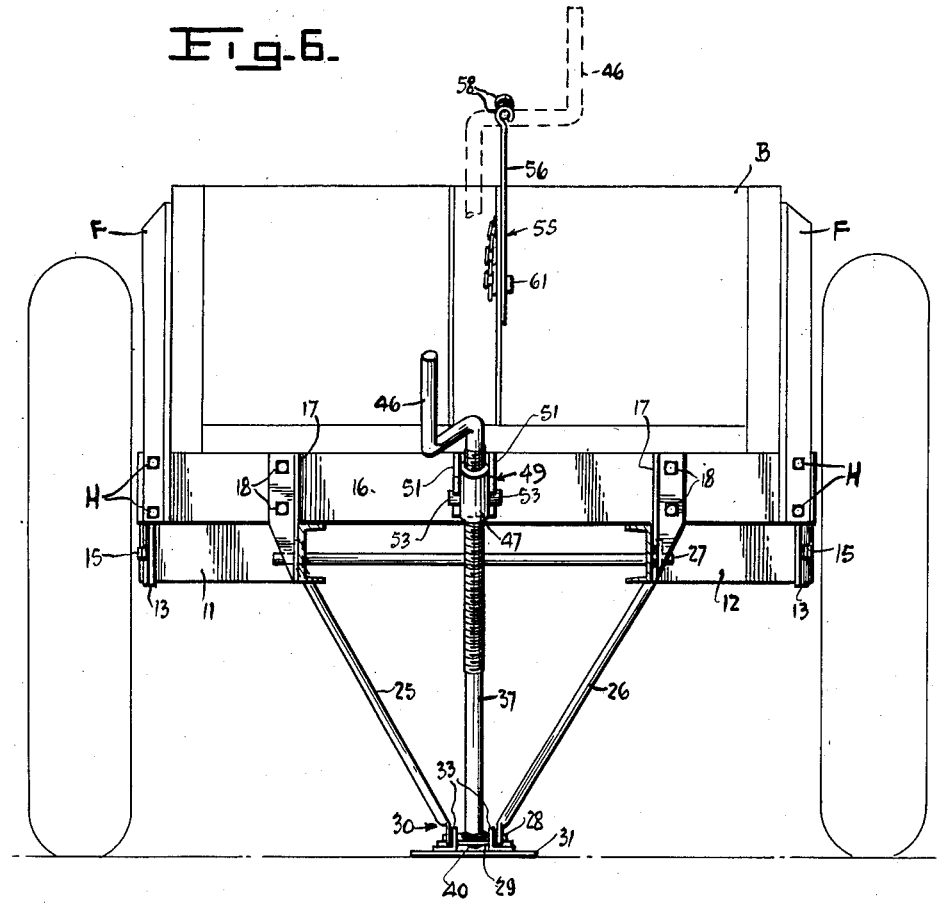
Fig. 6 is a vertical cross sectional view along the line 6—6 in Fig. 3.

Referring now more particularly and by reference characters to the drawing I have shown therein, for example, my present invention as applied to a manure spreader A of conventional construction having a box or body B adapted to contain the fertilizing material and having shredding and spreading means at its rear end C to deliver the material to the ground as the machine moves forwardly therealong. The rear end of the spreader is supported by wheels D and the forward end for horse drawn operation is provided with a tongue truck (not here shown) the axle of which is received in the downwardly opening spaces E at each corner of the box, formed by and between forward upright angles F and rear brackets G. Bolts H are passed through the parts F and G and through the axle therebetween but by removing these bolts (as in Fig. 2) the tongue truck may be readily removed when it is desired to use the spreader in connection with a tractor as will be apparent.

To then adapt the spreader to tractor operation I provide it with a hitch structure designated generally at 10 comprising a pair of forwardly converging hitch bars or beams 11 and 12 which extend rearwardly underneath the spreader body B to terminate at rear ends substantially midway between front and rear ends of the body. At this point the rear ends of the hitch bars 11 and 12 stand below the lower ends of upright frame bars I secured on the sides of the body B and are connected thereto by rigid hanger straps 13 bolted at 14 and 15, respectively, to the bars I and hitch bars 11—12. The axle of the tongue truck is replaced between the angle F and bracket G in the space E by beam 16 which is then secured in place by the bolts H and beneath which beam the hitch bars 11 and 12 pass and to which they are anchored at these points by suitably bent brackets 17 bolted at 18 to the beam 16 and at 19 to the hitch bars. Obviously the hitch bars are thus rigidly connected to the body B but may be readily detached simply by removing the fastening bolts 14 and 15 when desired.

Forwardly of the spreader the hitch bars substantially meet and are joined by upper and lower clevis plates 20 and 21 bolted at 22 to the bars and extending forwardly therefrom in vertically spaced relation. These spaced ends of the clevis plates 20 and 21 are apertured to receive a clevis pin or drop pin 23 by which draft connection may be readily made to the drawbar J of a tractor K as required to properly pull and operate the spreader.

Cooperating with and as here shown supported on the hitch 10 is a jack structure designated generally at 24 comprising a swinging frame made up of arms 25 and 26 which at rear ends are pivotally supported on the hitch bars 11 and 12 by a cross pin 27 or other suitable pivot mounting. The arms 25 and 26 extend generally forward from this point and the pivotal action is such that the arms are swingable upwardly and downwardly at their forward ends with respect to the spreader. The arms converge in the forward direction and are so arranged and of such length that, when swung downwardly, they will reach ground level while in a forwardly and downwardly angled position (Fig. 3).

The converging ends of the arms 25 and 26 are pivotally attached to oppositely extending trunnions 28 formed at the sides of a bearing or thrust plate 29 forming a part of a ground engaging member designated generally at 30. Said member comprises a foot plate 31 upon which is rigidly mounted, as by bolts 32, transversely spaced and upstanding brackets or angles 33 apertured at 34 to pivotally receive said trunnions 28. The arm ends are apertured at 35 to fit the trunnions 28 and are retained against lateral displacement thereon by cotter pins 36. The bearing plate 29 is, as shown, disposed between the angles 33 and may swing in a vertical longitudinal plane about the axes of the trunnions.

A jack screw 37, a substantial length of which is threaded as designated at 38, is anchored at its lower end on the ground engaging member 30 and for this purpose the extremity of the screw is reduced in diameter to rotatably fit through an opening 39 formed centrally in the bearing plate 29. Beneath said plate a retaining washer 40 is applied to the reduced end of the screw and is held thereto by a cotter pin 41 to prevent upward displacement of the jack screw with respect to the ground engaging member. Between the annular shoulder 42, formed by the reduction of the extremity of the jack screw, and the upper surface of the bearing plate 29 there is positioned a bearing washer or wear disc 43 to take the down thrust of the jack and guard the plate from wear. The washer 43 is caused to turn with the jack screw 37 by a pin 44 (Fig. 5) extending diametrically through the screw and resting in notches 45 formed in the washer. The upper end of the jack screw is formed with a crank or handle 46 by which it may be conveniently turned by hand.

Figures 7, 8:
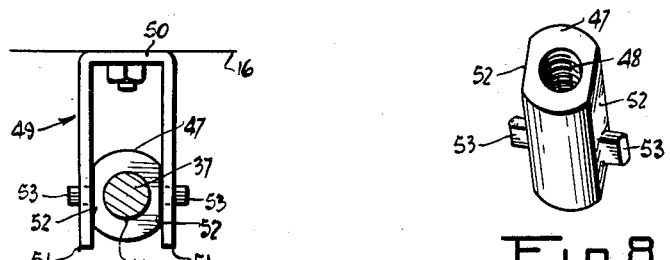
Fig. 7 is a sectional detail view along the line 7—7 in Fig. 3.
Fig. 8 is a perspective view of the nut member which threadedly engages the jack screw.

A nut member 47 having a tapped bore 48 is threaded on the jack screw 37 and to brace and support this member while the jack is in operation I provide a support bracket 49 having a base portion 50 secured to the cross beam 16 centrally thereof. From this base portion 50 transversely spaced sides 51 are extended in a forward direction and are disposed on edge so that the nut member 47 may fit therebetween. As best shown in Figs. 7 and 8 diametrically opposite sides of the nut member are faced off straight and parallel at 52 to such point that they will just nicely slip between the sides 51 of the bracket 49 and will prevent the nut member from rotating while it is in the bracket. Extending from these faced off sides 52 of the nut member are lugs 53, which are oppositely and diametrically extended, and the undersides or lower edges of the bracket sides 51 are provided with shallow, upwardly rounded or convexed notches 54 to receive these lugs.

A yoke 55 is attached to the forward end L of the spreader box B by a tang 56, the upper end of which is split to form an upwardly opening fork 57, the extremities thereof being formed into eyes 58 to receive a retaining pin 59. The pin is attached by a chain 60 to the bolt 61 holding the yoke in place to prevent loss of the pin.

In operation when the front truck of the spreader is removed or replaced by the hitch 10 the jack may be arranged to support the front end of the spreader by swinging the arms 25—26 downwardly and hooking the lugs 53 under the notches 54 in the bracket 49. By then turning the jack screw 37 the ground engaging member 30 may obviously be forced downwardly and supported in contact with the ground as clearly shown. The hitch may be nicely adjusted to the level of the tractor draw bar J, or the spreader supported level when it is not in use, in this manner.

After the hitch is connected to the tractor the jack screw may be turned to raise the foot plate 31 slightly, after which the lugs 53 may be swung forwardly out of the notches 54 so that the jack screw may be pulled upwardly and supported by its crank 46 in the yoke 55 as clearly shown in Figs. 1 and 6. The entire jack structure is thus elevated as a unit to stand well clear of the ground and between the sides of the hitch during transport. The pin 59, of course, prevents the crank 46 from escaping from the yoke until the jack is again to be used.

The pivotal mounting of the bearing plate 29 enables it to stand at all times at right angles to the axis of the jack between the screw and plate 31 as the same is raised and lowered. An even support and bearing is thus provided to absorb the end thrust of the screw.

The mechanism of my invention is not, of course, limited to the application to manure spreaders herein illustrated but may be applied to other types and kinds of vehicles and implements wherever suited to any purpose.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle jack of the character described, comprising at least one arm pivotally attached at one end to the vehicle and swingable upwardly and downwardly at its other end with respect thereto, a ground engaging member on the swinging end of the arm, a jack screw attached at its lower end to said ground engaging member, a nut member threaded on the jack screw, a bracket on the vehicle, operative to non-rotatably engage the nut member, the said bracket having notches, and lugs on the nut member for upward and releasable engagement with said notches to support the nut member as the jack screw is operated therein.

2. A jack for attachment to a vehicle, comprising at least one arm swingably mounted for up and down movements with respect to the vehicle, a jack screw operatively arranged for raising and lowering the arm, said jack screw having a crank on its upper end, and a member on the vehicle operative to engage the crank and support the screw and the arm in an elevated transport position.

3. In a vehicle jack of the character described, at least one arm pivotally attached at one end to the vehicle and swingable at its other end upwardly and downwardly, a ground engaging member on the swinging end of the arm, a jack screw attached to the ground engaging member and extending upwardly therefrom, a nut member threaded on the jack screw, a bracket on the vehicle, the said bracket having notches, and projecting means on the nut member for engaging the said notches and non-rotatably supporting the nut member as the jack screw is turned therein for adjusting the ground engaging member.

4. In a vehicle jack of the character described, at least one arm pivotally attached at one end to the vehicle and swingable at its other end upwardly and downwardly, a ground engaging member on the swinging end of the arm, a jack screw operatively attached at one end to the ground engaging member, a bracket on the vehicle, a nut member threaded on the jack screw and having means for releasably and supportably engaging the bracket and supporting the screw in a generally erect position whereby rotation of the screw through the nut member will adjust the ground engaging member, and means for supporting the screw and arm in elevated transport positions when the nut member is released from the bracket.

5. In a vehicle attached jack of the character described, a pivot support and a support bracket mounted in spaced relation on the vehicle, an arm pivoted at one end to the pivot support and swingable upwardly and downwardly at its other end below the bracket, a ground engaging member on the latter end of the arm, a jack screw pivotally and rotatably connected at one end to the ground engaging member, a nut member threaded on the jack screw and adapted to be upwardly braced against the bracket as the screw is turned for thrusting the ground engaging member downwardly, the said nut member being releasable from the bracket for swinging the arm and jack screw upwardly to transport position, and means for supporting the screw and arm in such transport position.

JOHN P. SEAHOLM.

REFERENCES CITED

The following references are of record in the file of this patent:

UNITED STATES PATENTS

| Number | Name | Date |
|---|---|---|
| 540,744 | King | June 11, 1895 |
| 1,259,120 | Martin | Mar. 12, 1918 |
| 1,448,054 | Clement | Mar. 13, 1923 |
| 1,713,332 | Davis | May 14, 1929 |
| 1,983,433 | Benbow | Dec. 4, 1934 |
| 2,196,510 | Vutz | Apr. 9, 1940 |
| 2,205,436 | Richards | June 23, 1940 |
| 2,226,577 | Parks | Dec. 31, 1940 |

FOREIGN PATENTS

| Number | Country | Date |
|---|---|---|
| 155,648 | Switzerland | Sept. 16, 1932 |